Reissued Nov. 9, 1926.

Re. 16,465

UNITED STATES PATENT OFFICE.

HENRY PHILIP SHOPNECK, OF DORCHESTER, MASSACHUSETTS, ASSIGNOR TO JOHN J. DALY, OF WEST NEWTON, MASSACHUSETTS.

FELTED BOX-TOE STOCK AND METHOD OF MAKING THE SAME.

No Drawing. Original No. 1,574,208, dated February 23, 1926, Serial No. 47,371, filed July 31, 1925. Application for reissue filed July 21, 1926. Serial No. 124,112.

Various substitutes have been proposed for the expensive wool felt used in box toe stock in the effort to produce a low-cost, durable box toe material which will be sufficiently absorbent to take up and retain the thermo-plastic binder, which will possess sufficient tensile strength to hold its shape under the severe strains in lasting the shoe, and which will not only have capacity for stretch to assume the shape of the toe but will be sufficiently resilient to return to shape after compression. Felt containing hair has been proposed, but so far as I am advised, nothing has been found as a substitute for animal hair to give the required strength to such box toe stock. The cost of hair is, however, very high and makes factory material sometimes hard to obtain. Hair is furthermore difficult to work in the stock and run on a cylinder felting machine.

To the end, therefore, of producing a box toe stock which will embody the foregoing requisites while entirely avoiding the use of hair and wool felt, I have devised my present invention. According to it, I take a short fibered stock, such as waste textile rags (mixed rags containing more or less wool) or a mixture of such rags and wool or other fibres, and beat it out until smooth. To this I add relatively long vegetable fibres, such as cotton, rayon, jute, manila, hemp, or sisal, and then smooth out the mixture without cutting the long vegetable fibres.

I obtain the vegetable fibres from usual sources, and they are preferably loosely fiberized before incorporation into the mix.

The mix is beaten out in a beater and run on a cylinder felting machine. I thus obtain a water-laid felt in which the long vegetable fibres are uniformly distributed throughout the body of short fibres and in felted relation therewith. Where the felt is used for box toes it is impregnated when dry with a thermo-plastic binder, such as a mixture of hardened rosin and oil-blown asphalt, by dipping the felt material into a fluid bath containing the thermo-plastic compound.

By using vegetable fibres, instead of animal hair, as has been proposed heretofore, I obtain a mix which not only felts better, but is stronger and can be more easily moulded on a last. It is common knowledge that animal hair of itself does not "felt", as this term is used in referring to the forming of stock into sheets by means of a cylinder felting machine, whereas jute has a felting action. A satisfactory felt is obtained by using a furnish consisting of approximately 30% jute or other relatively long vegetable fibre and 70% rag, wool or other fibrous stock.

If desired, I may increase the proportion of vegetable fibre to the rag or wool fibres while retaining all the advantages of increased tensile strength, by substituting for a portion of the rag stock, an equivalent portion of asbestos or other fibres, a characteristic mix consisting of approximately, 50% rag or wool stock, 30% vegetable fibres, and 20% asbestos. It is to be understood that what is meant by long vegetable fibres are either the elongated plant fibres composed mainly of cellulose, substantially free of lignin, such as cotton, linen, or the like, or the elongated fibres composed of a plurality of bundles of fibres which owe their adhesion to the encrusting effect of the ligneous constituents on the intercellular substances, such as jute, hemp, sisal, ramie, et cetera. This term also includes such long artificial vegetable fibres as rayon, viscose, and like artificial threads. It is also to be understood that what is meant by the terms "fibrous stock" and "body of short felted fibre", is a base of cotton, textile rags, wool, or asbestos, or similar fibres, with or without inert filler, or suitable mixtures of them.

These and various other modifications in materials and proportions, coming within the spirit and scope of my invention as defined by the appended claims, may obviously be resorted to.

What I therefore claim and desire to secure by Letters Patent is:

1. A felt, consisting of a fibrous stock, and relatively longer vegetable fibres and asbestos distributed throughout the mass in felted relation therewith and capable of being impregnated with a thermo-plastic binder.

2. A felt, consisting of a fibrous stock, and relatively longer jute fibres and asbestos distributed throughout the mass in felted relation therewith and capable of being impregnated with a thermo-plastic binder.

3. A felt, consisting of a fibrous stock and relatively longer jute fibres and asbestos distributed throughout the mass in felted relation therewith and capable of being impregnated with a thermo-plastic binder, the proportion of vegetable fibres and asbestos each being substantially less than that of the fibrous stock.

4. The method of making a felted stock, which consists in forming a sheet from a beaten fibrous stock to which has been added relatively longer vegetable fibres of the class described and asbestos, and in subsequently impregnating said sheet with a thermo-plastic binder.

5. A box toe material, comprising a fibrous stock and relatively longer vegetable fibres and asbestos distributed throughout the mass in felted relation and impregnated with a thermo-plastic binder

HENRY PHILIP SHOPNECK.